United States Patent
Raj et al.

(10) Patent No.: US 8,600,941 B1
(45) Date of Patent: Dec. 3, 2013

(54) SYSTEM AND METHOD FOR AUTOMATIC CONFIGURATION OF NETWORKED INFORMATION TECHNOLOGY ASSETS FOR A BACKUP, RECOVERY AND ARCHIVING APPLICATION

(75) Inventors: Anand Raj, Bangalore (IN); Suryanarayanan Rangarajan, Santa Clara, CA (US)

(73) Assignee: EMC Corporation, Hopkinton, MA (US)

( * ) Notice: Subject to any disclaimer, the term of this patent is extended or adjusted under 35 U.S.C. 154(b) by 868 days.

(21) Appl. No.: 12/112,407

(22) Filed: Apr. 30, 2008

(51) Int. Cl.
*G06F 7/00* (2006.01)

(52) U.S. Cl.
USPC .......................................... 707/640

(58) Field of Classification Search
USPC ............... 707/640, 634, 661, 674, 999.204
See application file for complete search history.

(56) References Cited

U.S. PATENT DOCUMENTS

| | | | |
|---|---|---|---|
| 2004/0236800 A1* | 11/2004 | Elkady et al. | 707/204 |
| 2006/0161879 A1* | 7/2006 | Lubrecht et al. | 717/101 |
| 2007/0198609 A1* | 8/2007 | Black et al. | 707/204 |
| 2007/0288280 A1* | 12/2007 | Gilbert et al. | 705/8 |
| 2008/0114792 A1* | 5/2008 | LaMonica | 707/100 |
| 2008/0126439 A1* | 5/2008 | Kaminsky | 707/203 |
| 2008/0209005 A1* | 8/2008 | Akamatsu et al. | 709/217 |
| 2009/0012997 A1* | 1/2009 | Rajaraman et al. | 707/104.1 |

\* cited by examiner

*Primary Examiner* — Mohammed R Uddin
(74) *Attorney, Agent, or Firm* — Dergosits & Noah LLP; Todd A. Noah

(57) ABSTRACT

The invention is a system and method for detecting and configuring network resources for a backup and recovery application. The invention identifies data, software and hardware accessed through a network for the backup and recovery application. Additionally, the present invention identifies dependencies and relationships between the data, hardware and software. The invention thereby provides an updated overview of the entire network environment to the backup and recovery application. Using the invention, the backup and recovery application may backup data and the software that uses the data, as well as the configuration for the hardware that stores or accesses the data. During recovery, the invention will restore the data, hardware and software in the proper sequence and configuration. The present invention thereby enables proper recovery to any selected point in time, and ensures that after recovery, network resources function as they did at that selected point in time.

20 Claims, 2 Drawing Sheets

SYSTEM AND METHOD FOR AUTOMATIC CONFIGURATION OF NETWORKED INFORMATION TECHNOLOGY ASSETS FOR A BACKUP, RECOVERY AND ARCHIVING APPLICATION

TECHNICAL FIELD

The present invention relates generally to backup and recovery applications, and specifically, to managing the data, hardware and software for backup and recovery by such applications.

BACKGROUND OF THE INVENTION

Data backup fulfills three important goals: protection, preservation and compliance. Data backup is a protective measure because it ensures against data loss. It is a preservative measure because it enables version tracking. It is a compliance measure because data backup and retention may be required by law. In order to fulfill these three goals, data backup must be seamless, up to date and fully recoverable. If backed up data cannot be fully recovered and restored to an accessible state at any selected point in time, then the goals of data backup are not met.

Organizations that generate and access large amounts of data typically use numerous different information technology (IT) assets connected over a network. IT assets include the hardware and software used to create, store and access the data. In most organizations, one department is responsible for acquiring IT assets (purchasing) while another department is responsible for maintaining these assets (IT). As an organization grows, it acquires more IT assets and generates more data. It is the IT department's responsibility to ensure that the IT assets and the data associated with these assets perform as expected. Additionally, the IT department must make sure that the data is periodically backed up. The IT department will typically employ Backup, Recovery and Archiving (BURA) applications to manage data backup. In order to ensure that all data is properly backed up and archived, each IT asset must be configured to work with the BURA application. Maintaining the hardware and software configurations for newly acquired IT assets is usually performed manually on a computer by computer basis by IT personnel.

In large organizations, there is often a lack of communication between the purchasing department and the IT department. As a result, the purchasing department may not notify the IT department when new IT assets are added to the network. The purchasing department may acquire a number of computer workstations and attach them to the network, allowing these workstations to generate and access network data without ensuring that these workstations have been properly configured for backup. Additionally, individual users may purchase and install their own computers or other IT assets without notifying the IT department. A user may also independently install software on a company computer without consulting the IT department, which may unknowingly affect the computer's configuration. As a result, data from these unknown or altered IT assets may not be adequately backed up or protected by the BURA application. While in most cases, these IT assets may operate for extended time periods without issue, in the event of a disaster, the data stored by these assets may be irrevocably lost.

As noted previously, once an IT asset has been added or altered, an IT person must manually configure the IT asset to ensure that it communicates with the BURA application for backup purposes. Manual configuration may involve identifying the type of operating system on the IT asset, the amount of storage space on the IT asset, and the hardware profile of the IT asset. Configuration may also require the installation of drivers, APIs or other software agents that enable communication with the BURA application. Manual configuration is a tedious and time-consuming process that reduces the availability of IT personnel for other more important tasks. In event that an IT asset loses the ability to communicate with the BURA application due to user interference or the unauthorized installation of software, it is often difficult for the IT person to discover what changes have been made to the IT asset. Figuring out how an IT asset has changed is also extremely time-consuming and an inefficient use of IT personnel.

In addition to the above, other issues may arise when data created or accessed on one computer is stored on another computer or server. As a result, other computers on the network may also manipulate the same data files. In order to be effective, the BURA application must be able to access all forms and locations of these stored data files. Present BURA applications typically create mirrored backups of all stored data files by periodically copying, compressing and archiving them onto media for permanent storage. While this meets most compliance policies, it does not guarantee that these archived data files will be accessible if recovered. Storage of data alone is not enough to ensure that in the event of a disaster, a network and its IT assets can be re-built and operational in the exact same state as prior to disaster. This is because simply copying or moving data into storage does not account for changes in the software that is used to access that data. Software upgrades can sometimes prevent users from accessing older data files created or accessed using previous software versions.

Hardware upgrades may also hinder access to archived data. IT asset hardware and operating system changes can affect the data files associated with the hardware in subtle ways. Present BURA applications typically backup and archive the data stored on IT assets, but ignore the configurations or precise setups of these IT assets. As a result, while the data may be preserved, the relationships between the data and the hardware may not be protected. Data stored without considering the hardware and software configurations associated with the data may render those stored files inaccessible or inoperable, even if the files are successfully recovered.

Another issue affecting data backup and recovery involves the timing of backed up IT assets. A backup session may be scheduled to occur at specific time intervals, but the time intervals for each IT asset or server on the network may not be the same. For example, an email server may be backed up weekly, but a less commonly accessed storage server may only be backed up monthly. Changes in hardware and software can occur between these different backup sessions, in addition to changes in the data that may be accessed on both servers. As a result, during recovery, if the different servers are restored using backups created at different times, the data on the restored servers may not be properly synchronized. As a result, data may be lost or inaccessible. Present methods may therefore not be fully effective at meeting the goals of data backup. Access to archived data files may be dependent upon recognizing the proper software and/or hardware configurations used to create those files.

What is therefore needed is a way to enable intelligent backup and recovery. The hardware or software application responsible for backup and recovery needs a way to keep track of all of the configurations and relationships between all of the data, hardware and software that are backed up. The application also needs a way to account for changes to the network, including software or hardware upgrades, installation or removal of software and hardware, and changes to the data. The application further needs a way to identify when new IT assets have been added to the network, and to ensure that the IT assets are properly configured to work with the application, and that data stored on these IT assets are adequately protected by the application.

BRIEF DESCRIPTION OF THE FIGURES

The present invention is illustrated by way of example and not limitation in the figures of the accompanying drawings, in which like references indicate similar elements, and in which.

DETAILED DESCRIPTION OF THE INVENTION

The present invention provides for automatic configuration of IT assets connected by and on a network. As noted previously, "IT assets," or "assets," refer to the hardware and software accessible on the network, and may include computing devices, storage devices, memory, operating systems, software applications and the like. The present invention contemplates that these IT assets contain or access data protected by a Backup, Recovery and Archiving (BURA) application, which may be implemented as hardware or software or a combination of both hardware and software. The BURA application may exist on a separate BURA application server connected to the network, or it may be installed in whole or in part across multiple computers on the network. An embodiment of the present invention functions as part of a BURA application. The present invention may enable the BURA application to access the network, detect IT assets and configure them automatically, thereby eliminating manual configuration by an IT professional. Further, the present invention ensures that recovery of data contained or accessed by the IT assets, as well as the configurations for each of those assets occurs seamlessly and without error. Other features and benefits of the present invention are discussed below.

It should be appreciated that the present invention can be implemented in numerous ways, including as a process, an apparatus, a system, a device, a method, or a computer readable medium such as a computer readable storage medium comprising computer program instructions, one or more software modules, or a computer network wherein computer program instructions are sent over optical or electronic communication links. Applications may take the form of software executing on a general purpose computer or be hardwired or hard coded in hardware. For purposes of the following description, the terms "network," "computer network," and "online" may be used interchangeably and do not imply a particular network embodiment or topography. In general, any type of network (e.g., LAN, WAN, or Internet) may be used to implement the online or computer networked implementation of the present invention. Similarly, any type of protocol (e.g., HTTP, FTP, ICMP, UDP, WAP, SIP, H.323, H.264) may be used to communicate across the network. In this specification, these implementations, or any other form that the invention may take, may be referred to as techniques. In general, the order of the steps of disclosed processes may be altered within the scope of the invention.

Figure 1:
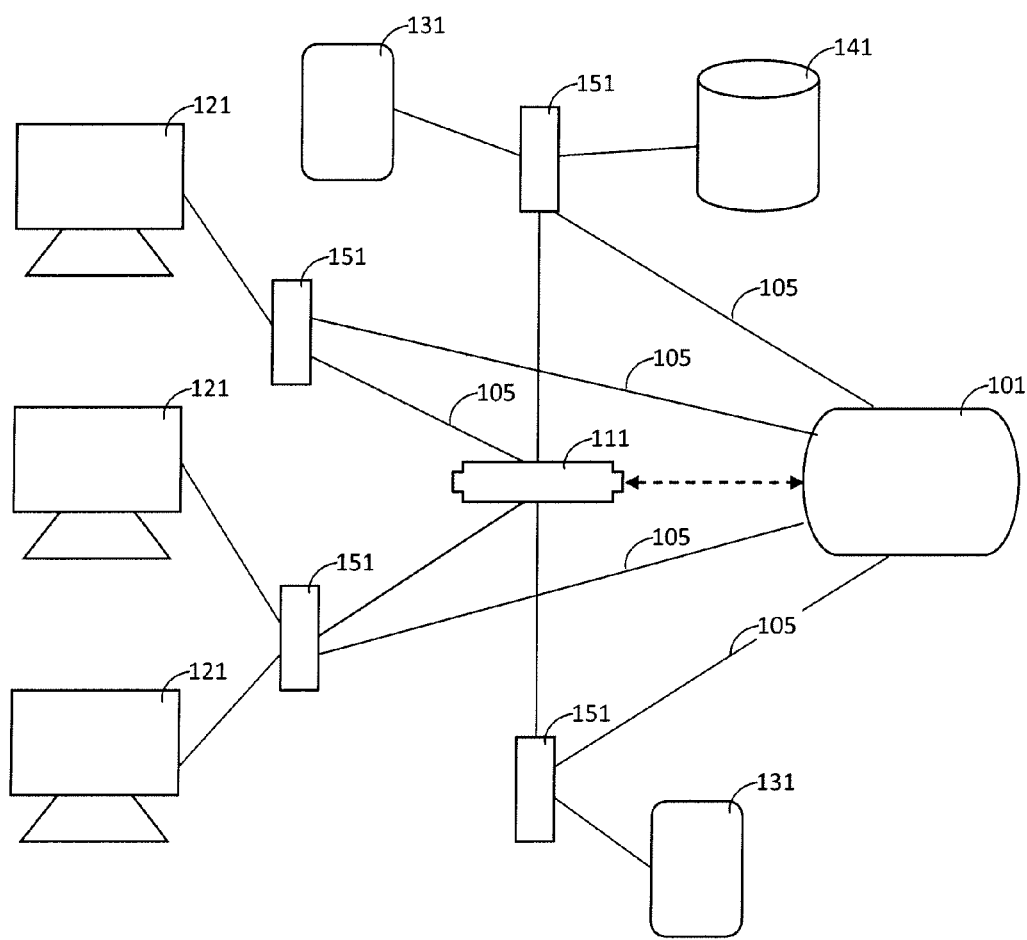
FIG. 1 is an exemplary block diagram depicting one embodiment of the present invention.

FIG. 1 illustrates an exemplary block diagram of the IT assets that may be connected to the BURA server 101 by a network 105. Various computer workstations 121 and servers 131 are also connected to the network 105 and may be accessed by BURA server 101. Additionally, various storage nodes 141 are connected to network 105. There may be one or more network switches or routers 151 directing network traffic on network 105. Additionally, a Configuration Management Database ("CMDB") 111 is also connected to network 105. The CMDB will be discussed further below. A person skilled in the art will appreciate that a BURA software application resides on BURA server 101 and is responsible for managing the backup, recovery and archiving (i.e., "protection") of the data accessible on network 105. One having ordinary skill in the art will also appreciate that other IT assets besides the computer workstations 121, servers 131 and storage nodes 141 may be connected to a network 105 and protected by a BURA server 101, and that FIG. 1 is merely an example overview of an organization's network. Other IT assets may be protected by the BURA application on the BURA server 101 without departing from the scope of the present invention.

Aspects of the present invention may be described as Asset Discovery, Asset Configuration, Data Backup and Data Recovery. Each of these aspects, as well as the benefits associated with each aspect, is discussed in turn below.

A. Asset Discovery by a BURA Application

The present invention adds IT asset discovery and mapping capabilities to a BURA application, thereby enabling automatic configuration of these IT assets by the BURA application. Configuration may include noting the network address of the IT asset, its operating system, installing any required drivers or APIs, determining how much memory is used and/or available on the asset, and determining if the BURA application needs to install a local agent to interact with the BURA application server. Prior art BURA applications are passive applications that cannot independently discover IT assets on a network; they are merely designed to backup existing data to a backup destination. As such, with a prior art BURA application, a system administrator must locate and manually configure IT assets, which may require physically locating and accessing the IT asset. The present invention automates this process, thereby freeing up the system administrator to tend to other IT tasks.

As shown in FIG. 1, the BURA application is typically stored on a BURA server 101 with access to a network 105. The network 105 links the BURA application to the IT assets whose data it protects. Using that access, the present invention may enable the BURA application to issue agents or queries in order to find out what IT assets are connected to the network 105. One skilled in the art will appreciate that these agents or queries may be operating system commands or the equivalent designed to elicit a response containing information on the various IT assets connected to the network. This response may help determine the baseline overview of the network's IT assets.

In an embodiment, the present invention may enable the BURA application to interact with or perform some or all of the tasks commonly associated with a CMDB tool. A CMDB tool is a software or hardware module that can detect what IT assets are present on the network, the relationships between the IT assets, and information about those IT assets. This is also known as dependency mapping. Once dependencies are mapped for the networked IT assets, these dependencies and other related information are typically stored in a database or similar data structure, such as a CMDB (111 of FIG. 1). In other words, a CMDB tool may use the results of its search of the network to populate the CMDB, which serves as a repository for this information. The CMDB is accessed and used by system administrators as a source of information about the IT assets on a network. Examples of how a CMDB tool performs IT asset discovery and dependency mapping are described in U.S. patent application Ser. No. 10/792,410 filed on Mar. 3, 2004; U.S. patent application Ser. No. 10/792,649 filed on Mar. 3, 2004; and U.S. patent application Ser. No. 11/152,821 filed on Jun. 13, 2005; all of which are incorporated herein by reference.

The CMDB 111 does not typically interact with BURA applications. The CMDB 111 is a separate data structure that is unusable by a BURA application, because the CMDB 111 may not be in a format recognizable by the BURA application. The present invention enables a BURA application to interact with a CMDB 111 and its CMDB tool in order to actively monitor and configure network IT assets. In other words, the present invention provides a bridge between a pre-existing BURA application and a CMDB 111. Alternatively, if the present invention enables the BURA application to perform all of the same tasks as the CMDB tool, and creates a CMDB-like data structure on the BURA application server, then the present invention may replace the separate CMDB 111 and CMDB tool.

One skilled in the art will appreciate that data may be sent along network 105 in the form of packets. Monitoring these data packets may be one way that a CMDB tool identifies the presence of an IT asset on the network. In an embodiment, the present invention may enable the BURA application to monitor packets passing through one of the routers 151 on the network. These packets may contain information about the type of device, type of communication or particular operating system used by the device receiving or transmitting the packet. This information may be communicated to the BURA application for storage in a database similar to a CMDB 111. Using this stored information, the BURA application may be able to monitor packets to identify and keep track of IT assets on the network 105. As such, the BURA application incorporates the capabilities typically provided by a CMDB 111 and its CMDB tool, thereby eliminating the need for the BURA application to depend upon a separate CMDB 111 for asset information.

In an embodiment, the present invention may also leverage an existing CMDB 111 that contains all relevant device and IT asset information, in which case the present invention may extract this information for the BURA application. Specifically, the present invention may permit the BURA application to query the CMDB 111 in order to gather information on the IT assets connected to the network. CMDB 111 may already contain all of the information on connected IT assets, since that is what it is designed to do. The CMDB 111's tool may have already populated the CMDB 111 with information on all of the IT assets connected to the network, such as the IT asset names, types, characteristics, storage capabilities, etc. As such, the present invention may act as a conduit between the BURA application and the information stored in CMDB 111, which presently does not exist in the prior art.

For example, since the CMDB 111 may already contain all of the information and configurations of the IT assets connected on network 105, rather than monitoring packets at a router 151, the BURA application may query the CMDB 111 directly. The CMDB 111 may be programmed to receive queries from the BURA application, just as CMDB 111 may receive queries and commands from the system administrator. When the CMDB 111 receives a request for all of the IT assets on the network 105, it may return a listing of the assets in a format readable by the BURA application. In an embodiment, the CMDB 111 may transmit an XML document listing all of the network addresses, device types, storage capacity, operating systems, and other information to the BURA application. The BURA application may cause this XML document to be stored in the BURA server 101. With this information, the BURA application may be able to locate all of the data accessible through network 105, thereby enabling the BURA application to seek out this data for backup and archive.

In an embodiment, rather than wait for queries from the BURA application, the CMDB 111 may be configured to periodically transmit XML reports to the BURA server 101. In this aspect, the CMDB 111 becomes an interactive agent of the BURA application, supplying it with information that may be used to backup data stored or accessed by the IT assets identified by the CMDB 111's tool. This may be helpful in situations where users of network 105 frequently add IT assets to the network. For example, a user may purchase a new computer and add it to the network 105 without the system administrator's knowledge or help. A user may access network 105 remotely using off-site computers. A user may add a storage device or may decide to use a smartphone or other web-enabled mobile device to access data and interact with network 105. If the BURA application is not made aware of these new additions, then data created, changed or accessed using these new additions may not be backed up. The BURA application will not automatically backup data on the network if it is not made aware of the new IT asset that creates or stores that data. Further, even if the BURA application is made aware of the new IT asset, that IT asset may not be configured properly to interact with the BURA application. By providing the BURA application with the ability to interact with a CMDB that may be better equipped to detect new additions, the present invention ensures the data associated with any new IT assets is protected.

A benefit of providing the BURA application with CMDB capabilities is that it gives the BURA application and the BURA application server an idea of the resources available on the network 105. This is because the automatic asset detection aspect of the present invention allows the BURA application to discover computing as well as storage devices connected to network 105. Accessing the CMDB or performing tasks similar to a CMDB tool will provide the BURA application with information on how much data is stored on the computing devices, as well as how much storage space is being used on the storage devices. As such, the BURA application will be able to assess and balance the memory loads and storage needs for data on the IT assets connected to network 105.

A further benefit of automatic asset detection is that it enables the BURA application to keep track of any changes made to the existing IT assets on the network. As noted previously, IT assets may change due to user intervention, hardware upgrades or software upgrades. By enabling the BURA application to perform like a CMDB tool and/or access a CMDB, the BURA application is made aware of these changes and can adjust configurations accordingly. The steps for configuring these assets are discussed further below.

B. Automatic Configuration of IT Assets

Simply keeping the BURA application up-to-date with new IT assets may not be sufficient to ensure that the data associated with these new IT assets is adequately protected. For example, it is not uncommon for a local agent, API or other type of program to be installed on IT assets. These APIs make sure that the IT asset is compatible with the BURA application. Any incompatibilities may result in unprotected data. The system administrator is responsible for seeking out new IT assets and installing any necessary APIs, agents, drivers or other software. This is known as configuring the IT asset. The system administrator may use a CMDB to locate new IT assets, or may rely on users to provide notification of any new additions to the network. The present invention automates configuration, thereby freeing up the system administrator to perform more important IT tasks. Automated configuration also ensures that all IT assets are properly configured, and that no IT asset is overlooked because of user or system administrator neglect.

By providing means for the BURA application to interact with the CMDB 111, not only will the BURA application be able to maintain an up-to-date picture of the IT assets on the network 105, but the BURA application will also be able to use network 105 and the information gained from accessing the CMDB 111 to configure new assets that are added. For example, if a new Windows-compatible computer is added to the network 105, the present invention may cause the BURA application to install a Windows-compatible module on the computer. This will allow proper configuration of the computer as a client of the BURA server 101. As a result, the BURA application will be able to data on the new Windows-compatible computer for backup or archiving.

Figure 2:
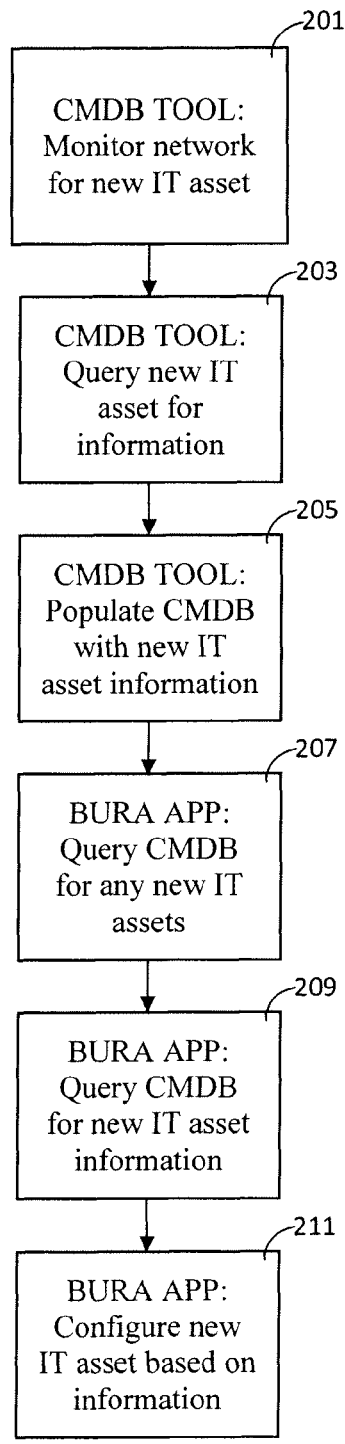
FIG. 2 is an exemplary flow diagram illustrating the steps of an embodiment of the present invention.

FIG. 2 is a flow diagram illustrating an exemplary series of steps that may be performed in order to automatically configure IT assets using the present invention. FIG. 2 contemplates that the software aspects of the present invention have already been added to a BURA application, and that the BURA application has access to a network of IT assets designated for data backup. FIG. 2 also contemplates that the BURA application has access to a CMDB storing information on the IT assets connected to the network.

In step 201, a CMDB tool monitors the network to see if any new IT assets are added to the network. If the CMDB tool detects that a new IT asset has been added, it will query the asset (step 203) and populate the CMDB with details about the new IT asset (step 205), such as the name of the asset, the type of asset, the type of storage capacity on the asset, the type of data stored in the asset, etc. The CMDB may be configured to periodically query the network for new IT assets, or new IT assets may be routed through the CMDB such that any change in network configuration will be queried to see if it is the result of the addition of a new IT asset.

Once the CMDB is updated with new IT asset information, it may send a signal to the BURA application. Alternatively, the BURA application may periodically query the CMDB to see if there have been any changes made since the last time the CMDB was accessed (step 207). If the BURA application learns of the new IT asset through a query to the CMDB, the BURA application may send a second query to the CMDB to obtain the information on the new IT asset. Once the BURA application is made aware of the new IT asset, it may query the CMDB to obtain the information on the new IT asset (step 209). This information may be formatted as an XML document or other equivalent communication understood by the BURA application. Once the BURA application obtains this information, it will be able to use this information to determine how the new IT asset should be configured according to policies previously set by a system administrator, or according to a default configuration set within the BURA application. In an embodiment, the BURA application may display a message to a system administrator who will then instruct the BURA application on how to configure the new IT asset. Alternatively, the BURA application may be set to configure the IT asset automatically using the previously determined configuration or a default configuration. Whether automated or customized, configuration instructions will be sent from the BURA application over the network to the new IT asset (step 211). These instructions will configure the new IT asset to ensure that any data generated or managed by the IT asset will be backed up by the BURA application.

In an embodiment, the configuration instructions may cause the installation of a BURA client application on the new IT asset. The BURA client application may include specific APIs or other agents depending upon how the IT asset accesses the network and/or generates or manages data. For example, if the new IT asset interacts with an Exchange server, SQL database, SharePoint service, Live Mesh or other web or cloud-based applications, the appropriate APIs will need to be installed so that this data is effectively backed up. If the new IT asset is a storage device, then the CMDB will reveal the storage capacity of the device, and the BURA application can install monitoring agents that track the use of the device so that it can maximize memory resources, as mentioned previously. A person having ordinary skill in the art will appreciate that using the present invention, a BURA application may be able to automatically configure brand new IT assets, such as those used during Bare Metal Restore ("BMR") operations, as well as IT assets that may already be in use, but may be connected to network 105 for the first time. Once discovered and configured by the enabled BURA application, IT asset configurations may be kept up to date to ensure continuous interoperability with the BURA application.

The above summarizes the automated configuration aspects of the present invention. Other embodiments are possible without departing from the scope of this disclosure. For example, as described above and shown in FIG. 2, the BURA application may communicate with a CMDB 111 in order to get information about an IT asset. One skilled in the art will also appreciate that the present invention may enable the BURA application to detect IT assets itself by providing it with capabilities similar to a CMDB tool. In such a case, the BURA application may query the network for IT assets and compare to an internal database of asset information, determine if any new assets have been added, obtain the information for these assets, then automatically configure them accordingly. As previously mentioned, by providing a BURA application with the ability to detect both new and existing IT assets on a network, and by additionally providing the BURA application with the ability to automatically configure these assets, one may feel confident that data accessed on the network will be backed up and archived properly.

C. Data Backup

As noted previously, the present invention provides a BURA application with the ability to detect and configure IT assets. Once a BURA application has access to all of the IT assets on the network, backup of the data accessed or created by these assets may proceed. In the prior art, backup of data may only include the data files and data directories stored in the IT assets. With the present invention, because the BURA application is responsible for configuring the assets, the BURA application may also backup the configurations for these assets. In other words, in addition to storing the data files and data directories on the IT assets, the BURA application may also store the specific APIs, agents, modules or other BURA tools it installed on those assets. The benefit of backing up the IT assets' configurations in addition to the data stored on these IT assets is realized during recovery, which will be discussed further below.

A feature of the present invention is its ability to extend the BURA application's reach to IT assets that may have temporary access to the network. In other words, because the present invention provides for automatic discovery and configuration of all IT assets connected to the network, the BURA application will be able to provide data backup and archiving to those assets. IT assets with temporary access may include wireless devices, such as smartphones, personal data assistants, laptops or other portable computing devices. Additionally, other temporary IT assets may include non-company owned computers. An organization's network may be accessed from anywhere so long as there is an Internet connection. As such, data may be temporarily stored outside of the organization's typical network streams. Since the present invention allows for automatic discovery of these IT assets by using the CMDB, incorporating CMDB tool capabilities, and/or monitoring data packets, the present invention may detect these off-site IT assets and may configure them accordingly. As a result, data from these IT assets may be accessed by a BURA application using the present invention. Ensuring that all of these assets are identified and properly configured not only protects the data stored, created and accessed by these assets, but as discussed below, also ensures that this data may be restored in the event of a disaster.

D. Data and Configuration Recovery

Because the BURA application provides automatic IT asset configuration, the present invention also benefits the process of recovery. As noted above, a BURA application not only manages the backup and archiving of data, but it also manages data recovery. It is insufficient for an organization to simply backup and archive data. If in the event of a disaster, the organization cannot return to its operational state prior to the disaster, then the purpose of data backup and archival is not met.

The purpose of data recovery is to re-create the network and all of its IT assets, with all data and configurations intact. As such, an organization's backup and archival policy should account for the configurations of its IT assets in addition to the data stored and accessed by those IT assets. This means not only protecting the organization's data, but also storing information on how the different IT assets interact with each other. For example, in the prior art, information on the drivers and APIs may not be adequately backed up. Similarly, in the prior art, information on the different versions of software installed on the IT asset, or the sequence of installed software on the IT asset may not be backed up. Prior art BURA applications do not account for this information. As a result, in the event of a system failure of one of the assets, even though with prior art BURA applications, data is backed up and stored, it does not mean that the IT asset will work in the same way it did before recovery. A prior art BURA application may be able to reproduce all of the data, but the data may no longer be accessible if the proper drivers, APIs and software versions are lost.

The present invention eliminates this problem by enabling the BURA application to store the proper drivers, APIs and version of the software stored on the IT assets. As noted previously, because the present invention interacts fully with the CMDB, it can enable the BURA application to store the configurations of networked IT assets. Further, and more importantly, since the present invention enables the BURA application to record the sequence of installed software on an IT asset, the BURA application will be able to re-create the order of those installed software programs, thereby preserving the last working configuration. In other words, the present invention provides the BURA application with the ability to determine the best order in which to recover IT assets in the event of a disaster.

The ability to determine the order of recovery provides an invaluable benefit to an organization's data protection policy. By preserving the order of recovery for an IT asset, the last known working configuration for that IT asset is protected. During recovery, the BURA application will be able to re-install not only the backed up data, but the means to access that data.

In a further benefit, the present invention can provide an on-demand assessment of the recoverability of a network, and all of the data backed up from that network. For example, a BURA application augmented with the present invention will have an up-to-date assessment of the state of all of the IT assets to which it has access. This is because the BURA application will be able to interface with the CMDB. Since IT assets may be constantly added or removed from the network, and data accessed by these IT assets may be continuously changing, only the BURA application will be able to report how much of the network data and associated configurations are fully backed up.

Using this information, the BURA application can generate a "score" or other measurement system for the risk level. That is, if the network were to suffer a disaster, the BURA application would be able to rate how much data is recoverable at any given time, as well as how much of that data is accessible after recovery, given the known configurations of the IT assets on the network. Such a measurement would enable a system administrator to gauge the vulnerability of an organization's data at any time, providing a reliable scale for calculating the security level of the organization's data.

The present invention may also be used as a tool to solve issues related to data storage. In gathering information on the IT assets on the network, the BURA application provides a central source of such information for IT personnel. If data backup is unsuccessful for a particular IT asset, or for a series of IT assets, the issue may be due to those assets' configuration. The configuration may be corrected for an asset, and if the BURA application encounters similar issues with other IT assets, it can provide the corrected configuration for those other IT assets automatically. In this aspect, the present invention provides a method whereby one IT asset is repaired, and the BURA application learns the repair solution and spreads it to other IT assets on the network.

One will appreciate that in the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. For example, the present invention is described as a complement to existing BURA applications, providing such applications with the ability to interface with CMDBs. A person skilled in the art will appreciate that the present invention may provide the opposite as well, that is, providing a CMDB with access to and the capabilities of a BURA application. Further, the present invention has been described in the context of backup, recovery and archiving of data. One will appreciate that providing a centralized software application with the ability to detect and configure assets may also translate into the social networking realm as well. For example, the user data for social network members can be sought out and compared so that members with similar interests can be matched. The description of the preferred embodiments is not intended to limit the scope of the claims appended hereto.

What is claimed is:

1. A method for configuring an asset connected on a network comprising:
   providing a Configuration Management Database ("CMDB") having information about a new asset connected to the network for a first time;
   transmitting the information about the new asset from the CMDB to a backup application;

determining, by the backup application, how to configure the new asset so that the new asset is compatible with the backup application based on the information received from the CMDB that the new asset is not properly configured according to a predefined configuration policy; and configuring the new asset by the backup application so that the new asset is compatible with the backup application according to the predefined configuration policy and so that the backup application can backup data generated and managed by the new asset to a backup storage device, the data thereby being backed up on the backup storage device.

2. The method of claim 1, further comprising transmitting a request for information from the backup application to the CMDB before transmitting information about the asset from the CMDB to the backup application.

3. The method of claim 1, wherein the asset is selected from the group consisting of computer, server, router, and storage device.

4. The method of claim 1, wherein configuring comprises installing a software agent on the asset, and the software agent is compatible with the backup application.

5. The method of claim 1, wherein the information about the asset transmitted from the CMDB to the backup application is in XML.

6. The method of claim 1, further comprising storing the asset's configuration in a data structure.

7. The method of claim 1 wherein the configuring the new asset comprises:
providing a software agent to be installed on the new asset thereby enabling data on the new asset to be transmitted from the new asset to a backup storage device, the data on the new asset thereby being backed up on the backup storage device, and wherein before the providing the software agent, the software agent is not installed at the new asset.

8. The method of claim 1 wherein the determining how to configure the new asset comprises:
after the determining the new asset is not properly configured, providing a software agent for installation at the new asset in order to properly configure the new asset according to the predefined configuration policy.

9. The method of claim 1 wherein the determining how to configure the new asset comprises:
determining, based on the information about the new asset, that the new asset is not properly configured because the new asset does not have a software agent installed that permits data on the new asset to be backed up; and the configuring the new asset comprises:
providing the software agent to the new asset.

10. A method for configuring an asset connected on a network comprising:
detecting, by a backup application, information about a new asset connected to the network for a first time, the information including that the new asset is not properly configured according to a predefined configuration policy; and
configuring the new asset, by the backup application, based upon the information about the new asset so that the new asset is compatible with the backup application according to the predefined configuration policy and so that the backup application can backup data generated and managed by the new asset to a backup storage device, the data thereby being backed up on the backup storage device.

11. The method of claim 10, wherein the asset is selected from the group consisting of computer, server, router, and storage device.

12. The method of claim 10, wherein configuring comprises installing a software agent on the asset, and the software agent is compatible with the backup application.

13. The method of claim 10, further comprising storing the asset's configuration in a data structure.

14. A computer program product comprising a non-transitory computer useable medium having a computer readable program code embodied therein, the computer readable program code comprising:
code for transmitting information about a new asset connected to a network for a first time from a CMDB to a backup application;
code for determining, by the backup application, how to configure the new asset so that the new asset is compatible with the backup application based upon the information received from the CMDB that the new asset is not properly configured according to a predefined configuration policy; and
code for configuring the new asset by the backup application so that the new asset is compatible with the backup application according to the predefined configuration policy and so that the backup application can backup data generated and managed by the new asset to a backup storage device, the data thereby being backed up on the backup storage device.

15. A computer program product comprising a non-transitory computer useable medium having a computer readable program code embodied therein, the computer readable program code comprising:
code for detecting, by a backup application, information about a new asset connected to the network for a first time;
code for determining, by the backup application, how to configure the new asset so that the new asset is compatible with the backup application based upon the information that the new asset is not properly configured according to a predefined configuration policy; and
code for configuring the new asset by the backup application so that the new asset is compatible with the backup application according to the predefined configuration policy and so that the backup application can backup data generated and managed by the new asset to a backup storage device, the data thereby being backed up on the backup storage device.

16. A method for determining recovery risk comprising:
providing a backup application with access to a network, the network connected to a plurality of assets; and
determining, by the backup application, which of the plurality of assets have been configured by the backup application to allow the backup application to backup data generated and managed by the asset, and which of the plurality of assets have not been configured by the backup application to allow the backup application to backup data generated and managed by the asset, which enables an on-demand assessment of the recoverability of data from the assets connected to the network.

17. The method of claim 16, further comprising generating a score based upon the determining step.

18. A method for recovering an asset connected to a network comprising:
providing a backup application with access to the network;
providing a data structure for storing software programs installed on an asset and a sequence in which the software programs were installed on the asset by enabling the backup application to store the proper drivers, APIs and version of the software stored on the assets; and restoring, by the backup application, the software programs on the asset based upon the stored sequence.

19. The method of claim 18, further comprising:

providing a backup image of data previously stored on the asset; and restoring the data previously stored on the asset using the backup image.

20. The method of claim 19, wherein restoring the data comprises restoring the data in the order that the data was previously stored on the asset.

* * * * *